April 12, 1938. E. RICHTER 2,113,604
COMBINATION SALT AND PEPPER SHAKER
Filed Sept. 21, 1936
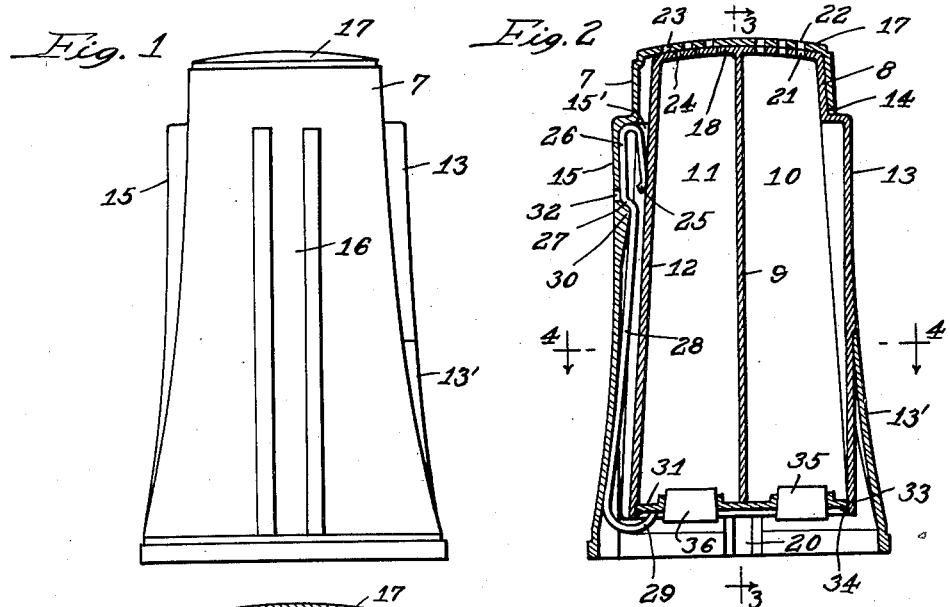
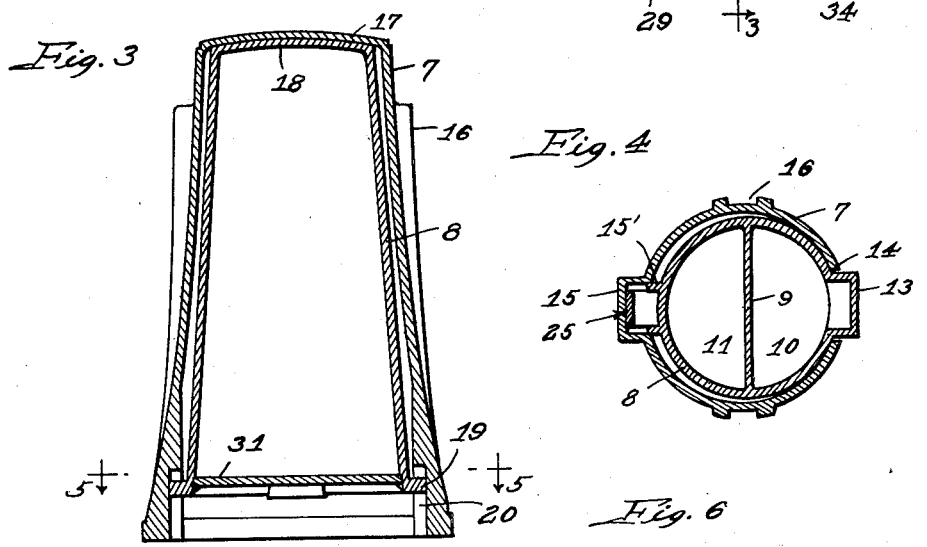
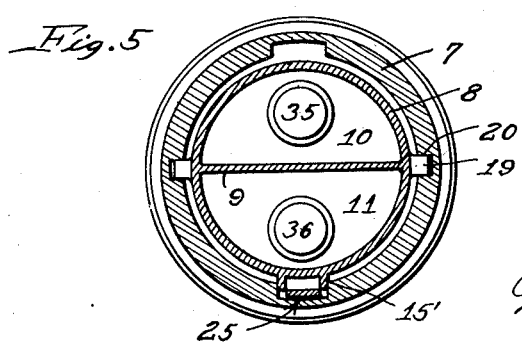
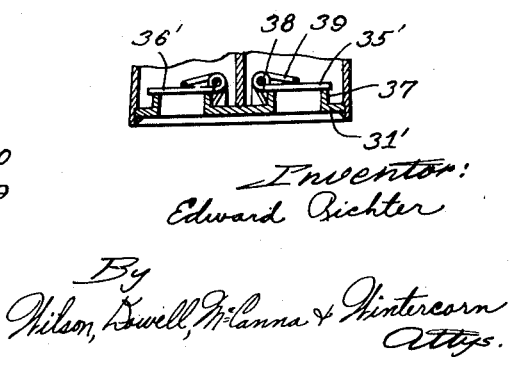
Inventor:
Edward Richter
By
Wilson, Powell, McKanna & Wintercorn
Attys.

Patented Apr. 12, 1938

2,113,604

UNITED STATES PATENT OFFICE 2,113,604

COMBINATION SALT AND PEPPER SHAKER

Edward Richter, Freeport, Ill., assignor of one-third to Walter M. Larson and one-third to August Richter, both of Freeport, Ill.

Application September 21, 1936, Serial No. 101,747

23 Claims. (Cl. 65—45)

This invention relates to a new and improved combined salt and pepper shaker.

I am aware that various types of two-in-one shakers have been proposed but none has apparently met with commercial acceptance, let alone commercial success. These prior constructions have invariably contained one or more features rendering them impractical, if not too unsightly or unconventional in appearance to prevent their adoption. Then, too, most of them were not constructed so that the switch-over from salt dispensing to pepper dispensing was as simple and convenient as desired in an article of this type. It is, therefore, the principal object of my invention to provide a combination salt and pepper shaker of simple and economical construction, attractive appearance, and quickly convertible from salt to pepper dispensing.

A further object of my invention is to provide a shaker made up with the minimum number of parts and which may be quickly and easily assembled and disassembled. In furtherance of this object I provide an outer shell or casing, and an inner salt and pepper container mounted for oscillation within the casing from one position to another together with a single, specially formed leaf spring which, when inserted in the casing, not only serves to hold the container in place but also exerts spring pressure thereon tending normally to hold the container in one position for salt dispensing.

Other objects and advantages of the present invention will soon appear in the course of the following description, wherein reference is made to the accompanying drawing, in which—

Figure 1 is a side view of my improved shaker;

Fig. 2 is a central vertical section;

Figs. 3 and 4 are sections on the correspondingly numbered lines of Fig. 2;

Fig. 5 is a section on the line 5—5 of Fig. 3, and

Fig. 6 is a sectional detail showing a modified or alternative construction.

Similar reference numerals are applied to corresponding parts throughout the views.

Refering first to Figs. 1-5, 7 designates the outer shell or casing of the shaker which closely resembles in appearance any conventional single purpose shaker and will, therefore, avoid the objections as to appearance many have had to two-in-one shakers. The casing is preferably, though not necessarily, molded of plastic composition material like bakelite so as to be available in different colors and finishes at a reasonable cost. The salt and pepper container 8 is preferably molded of the same material to match and has a longitudinal partition wall 9 separating the salt compartment 10 from the pepper compartment 11. It is, of course, obvious that reference to "salt" and "pepper" is not to be taken as having any limiting significance either here or in the claims. The side wall 12 of the pepper compartment is straight but the side wall of the salt compartment is formed to provide a hollow outwardly projecting longitudinal rib 13 which projects normally through a longitudinal slot 14 in the adjacent side wall of the casing 7, on the opposite side of the shaker from a hollow rib 15 formed integral with the side wall of the casing 7. The rib 13 on the container 8 completes what appears to be a rib on the casing 7, there being the lower portion of a rib 13' formed integral with the wall of the casing and matching up with the rib 13 to form a rib similar in appearance to the rib 15 on the opposite side of the casing. The ribs 13 and 15 are so nearly alike in appearance that the shaker presents a neat and symmetrical appearance when standing on the table or counter. The fluting indicated at 16 on the exterior of the casing in a plane at right angles is with a view to further enhancing the appearance of the shaker. it is also a part of the modernistic design with the ribs 13 and 15.

The top 17 of the casing is struck on an arc concentric with the arcuate top 18 of the container 8, the center for these arcs being on the transverse line through the trunnions 19 formed on the lower end of the container and projecting from opposite sides thereof. These trunnions are slidably and rotatably received in internal vertical grooves 20 formed in the adjacent side walls of the casing 7. The larger holes 21 in the container top for dispensing salt from compartment 10 are normally in register with holes 22 in the shaker top 17. The holes 23 in the other half of the shaker top are preferably of the same size as the holes 22 and serve to dispense pepper when the smaller holes 24 in the container top are brought into register therewith by the oscillation of the container from the salt dispensing position shown in Fig. 2 to the pepper dispensing position. The container is so oscillated by finger pressure against the rib 13 and the movement is against the action of a leaf spring 25. The latter is seated in the rib 15 and disposed between spaced longitudinal flanges 15' formed on the side of the container 8 and slidably received within the rib 15. The spring tends normally to hold the container in the salt dispensing position. The container swings on the trunnions 19 as a center relative to the casing 7 and in its swinging movement the flanges 15' sliding within the rib 15 keep the container 8 centrally located with respect to the casing 7. It is obvious from the description thus far that if one grasps the shaker by the fluted sides 16, or in any way such that the rib 13 is not depressed, the shaker will dispense salt. It is only when the rib 13 is properly depressed that the container 8 is swung over to its other extreme position and pepper can be dispensed.

The spring 25 in accordance with my invention completes the three part assembly forming the shaker, of which the other two parts are the casing 7 and shaker 8. I accomplish this by forming the leaf spring 25 with a loop 26 to define a shoulder 27 on the upper end of the shank 28 whose lower end has a hook 29 thereon, and by providing a supporting shoulder at 30 inside the rib 15 near the upper end on which the shoulder 27 of the spring will engage. In that way, the spring is held in place while it supports the container 8 by engagement of its hooked end 29 with the bottom 31 of the container, while at the same time the free end of the loop 26 presses against the side of the container to hold it normally in salt dispensing position. A small hole 32 in the wall of the rib 15 just above the shoulder 30 permits insertion of a match or pin whereby pressure may be exerted against the leaf spring 25 to unseat it from the shoulder 30 so as to permit removal of the spring and container from inside the casing. In that way, the housewife can readily take the shaker apart for thorough cleaning of all its parts inside and out.

The bottom 31 for the container 8 may also be molded of the same material as the container and casing and when so formed is arranged to be fastened in place permanently by insertion in the counterbore 33 in the lower end of the container. There is indicated at 34 cement for securing the bottom 31 in place and sealing the container. Now, while I may employ corks or other stoppers as at 35 and 36 to seal openings in the bottom 31 communicating with the compartments 10 and 11, respectively, I have shown in Fig. 6 a modified or alternative construction in which the bottom 31' has necks 37 molded integral therewith and providing valve seats for flap valves 35' and 36'. These valves are hinged, as at 38, and have coiled torsion springs 39 on their hinge pintles which hold the same normally closed. This permits the insertion of a funnel through the necks 37 to facilitate filling the salt and pepper compartments, the flap valves under those conditions being simply forced out of the way to admit the spout of the funnel and thereafter closing again automatically to seal the compartments.

It is believed the foregoing description conveys a good understanding of my invention. The appended claims have been drawn with a view to covering all legitimate modifications and adaptations.

I claim:

1. A condiment shaker comprising a supporting casing closed on top and open at the bottom, a condiment container inserted freely through the open bottom into said casing, the same being partitioned lengthwise into two compartments for different condiments and having a top wall with shaker openings provided therein for dispensing condiments from said compartments, the top wall of said casing also having two sets of shaker openings provided therein, either of which is arranged to register with related shaker openings in the container top by movement of the container laterally in said casing from one dispensing position to another, means for supporting said container in said casing for such movement, spring means holding the container in one extreme position in said casing for dispensing material from one of its compartments, and means whereby said container is movable by hand from outside the casing to its other extreme position, for dispensing material from its other compartment, while the casing is held in the hand for dispensing condiments.

2. A device of the class described comprising a casing having a shaker top, a container for the materials to be dispensed pivotally mounted at its lower end in said casing for reciprocatory movement of the upper end thereof from one dispensing position to another, the same being partitioned lengthwise into two compartments for different materials and having a top wall with shaker openings provided therein for dispensing materials from said compartments, the top of said casing also having two sets of shaker openings provided therein, either of which is arranged to register with related shaker openings in the container top by movement of the container laterally in said casing from one dispensing position to another, said container being substantially completely enclosed in said casing, spring means holding the container in one extreme position in said casing for dispensing material from one of its compartments and means projecting from said container to the outside of said casing whereby it is movable to its opposite extreme position by hand from outside the casing while the casing is held in the hand for dispensing material from said container.

3. A device of the class described comprising a casing having a shaker top, a container for the materials to be dispensed pivotally mounted at its lower end in said casing for reciprocatory movement of the upper end thereof from one dispensing position to another, the same being partitioned lengthwise into two compartments for different materials and having a top wall with shaker openings provided therein for dispensing materials from said compartments, the top of said casing also having two sets of shaker openings provided therein, either of which is arranged to register with related shaker openings in the container top by movement of the container laterally in said casing from one dispensing position to another, said container being substantially completely enclosed in said casing, said casing having a longitudinal rib on one side thereof, said container having a corresponding rib on the diametrically opposite side thereof projecting through a longitudinal slot provided in the side wall of said casing and adapted to be depressed by hand toward the wall of said casing while the casing is held in the hand for dispensing purposes, whereby to communicate movement to the container from one dispensing position to another, and spring means normally urging the container to move in one direction so as to project its rib from the casing to approximately the same distance as the first mentioned rib projects on the diametrically opposite side of the casing.

4. A device of the class described comprising a casing having a shaker top, a container for the materials to be dispensed inserted in said casing for reciprocatory movement of the top wall thereof relative to the shaker top, the container top wall having shaker openings provided therein for dispensing material when said container is moved laterally into position to register said openings with related shaker openings provided in the shaker top of said casing, said container being substantially completely enclosed in said casing, spring means tending to move the container normally in one direction within said casing whereby it is normally held in one position in said casing, and means projecting from said container to the outside of the casing whereby it is movable by hand from outside the casing while the casing is held in the hand for dispensing material from said container.

5. A device of the class described comprising a casing having a shaker top, a container for the material to be dispensed pivotally mounted at its lower end in said casing for reciprocatory movement of the upper end thereof, the same having a top wall with shaker openings provided therein for dispensing material when said container is moved laterally into position to register said openings with related shaker openings provided in the shaker top of said casing, said container being substantially completely enclosed in said casing, said casing having a longitudinal rib on one side thereof, said container having a corresponding rib on the diametrically opposite side thereof projecting through a longitudinal slot provided in the side wall of said casing and adapted to be depressed by hand toward the wall of said casing while the casing is held in the hand for dispensing purposes, whereby to communicate movement to the container from one position to another, and spring means normally urging the container to move in one direction so as to project its rib from the casing to approximately the same distance as the first mentioned rib projects on the diametrically opposite side of the casing.

6. A device as set forth in claim 5 wherein said casing rib is hollow, and wherein the spring means comprises an elongated leaf spring housed in said rib and bearing against the adjacent side of the container.

7. A device as set forth in claim 5 wherein said casing rib is hollow, and wherein the spring means comprises an elongated leaf spring housed in said rib and bearing against the adjacent side of the container, said spring being supported on said casing and having a lower end portion engaging the bottom of said container to support the same against downward displacement from operative position in the casing.

8. A condiment shaker comprising a supporting casing closed on top and open at the bottom, a condiment container inserted freely through the open bottom into said casing, the same being partitioned lengthwise into two compartments for different condiments and having a top wall with shaker openings provided therein for dispensing condiments from said compartments, the top wall of said casing also having two sets of shaker openings provided therein, either of which is arranged to register with related shaker openings in the container top by movement of the container laterally in said casing from one dispensing position to another, said casing having at its lower end internal substantially vertical grooves on the walls thereof at diametrically opposite sides, said container having diametrically opposed trunnions projecting from the sides thereof and entered in said grooves from the lower ends thereof for oscillatory movement therein, a single leaf spring disposed lengthwise between the side wall of the casing and the adjacent side wall of the container and acting normally to urge said container to swing in one direction on its trunnions, said spring being supported in said casing and serving by engagement with said container to support it against downward displacement from operative position in said casing, and means whereby said container is movable by hand from outside said casing against the action of said spring while the casing is held in the hand for dispensing condiments.

9. A device of the class described comprising a casing having a shaker top, a container for the materials to be dispensed pivotally mounted at its lower end in said casing for reciprocatory movement of the upper end thereof, the same having a top wall with shaker openings provided therein for dispensing material when said container is moved laterally into position to register said openings with related shaker openings provided in the shaker top of said casing, said casing having at its lower end internal substantially vertical grooves on the walls thereof at diametrically opposite sides, said container having diametrically opposed trunnions projecting from the sides thereof and entered in said grooves from the lower ends thereof for oscillatory movement therein, a single leaf spring disposed lengthwise between the side wall of the casing and the adjacent side wall of the container and acting normally to urge said container to swing in one direction on its trunnions, said spring being supported in said casing and serving by engagement with said container to support it against downward displacement from operative position in said casing, and means whereby said container is movable by hand from outside said casing against the action of said spring while the casing is held in the hand for dispensing purposes.

10. In a shaker of the character described, a supporting enclosing casing provided with a shaker top, the casing having an open bottom, a container for material to be dispensed also provided with a shaker top, said container being inserted into the casing through the open bottom thereof, and said casing being constructed so as to make the inserted container accessible for engagement and movement only from one side of the casing for movement manually toward the other side of the casing, said container being demountably pivoted in the casing to swing laterally therein, and spring means operative on said container inside said casing normally urging the container to swing in one direction.

11. A shaker as set forth in claim 10, wherein the container pivoting means comprises trunnions on the one of said container and casing elements entered in grooves provided in the other of said elements, whereby said container is removable from said casing, the trunnions being oscillatable in said grooves, the shaker including means for releasably supporting the container in assembled relation to the casing.

12. A shaker as set forth in claim 10, wherein the container pivoting means comprises trunnions on the one of said container and casing elements entered in grooves provided in the other of said elements, whereby said container is removable from said casing, the trunnions being oscillatable in said grooves, the spring means comprising a leaf spring removably engaged in said casing between the side wall of the casing and the adjacent side wall of the container having one portion bearing against the side of the container tending to move it yieldably in one direction, another portion engaging the bottom of the container to hold it against displacement downwardly out of the casing, and a third portion removably seated on a shoulder provided on the side wall of said casing whereby to support the spring on said casing.

13. A shaker as set forth in claim 10, wherein the container pivoting means comprises trunnions on the one of said container and casing elements entered in grooves provided in the other of said elements, whereby said container is removable from said casing, the trunnions being oscillatable in said grooves, the spring means comprising a leaf spring removably engaged in said casing between the side wall of the casing and the adjacent side wall of the container having one portion bearing against the side of the container tending to move it yieldably in one direction, another portion engaging the bottom of the container to hold it against displacement downwardly out of the casing, and a third portion removably seated on a shoulder provided on the side wall of said casing whereby to support the spring on said casing, the casing having an opening provided in the side wall thereof adjacent said shoulder for the insertion of a tool to disengage said spring from said shoulder, whereby to permit removal of the spring and container from the casing.

14. In a shaker, a casing to enclose a container for the material to be dispensed, said casing having an outwardly projecting rib on the side thereof, and a material container in said casing having a similar rib protruding from said casing through a slot provided in the wall of said casing, said container normally occupying one position with its rib protruding but being arranged to be moved by depression of said rib by hand when the casing is grasped, said container and casing having related perforated shaker tops arranged to be brought into register by movement of the container relative to the casing.

15. In a shaker, a casing to enclose a container for the material to be dispensed, a material container in said casing having a rib on the side thereof protruding from said casing through a slot provided in the wall of said casing, said container normally occupying one position with its rib protruding but being arranged to be moved by depression of said rib by hand when the casing is grasped, said container and casing having related perforated shaker tops arranged to be brought into register by movement of the container relative to the casing, and spring means normally urging said container in one direction so that the rib will protrude.

16. In a device of the class described, a longitudinally partitioned container having an arcuate shaker top and trunnions on the sides thereof in longitudinally spaced relation to the top and on a line passing through the center of the arc thereof, a casing having an arcuate shaker top to match the top of said container and receiving said container therein with its top slidably engaging the top thereof, the casing having bearings therein for said trunnions, spring means holding said container normally in one dispensing position within the casing, regardless of the position of the casing, so that the device will normally dispense the material in one compartment of the container, and means whereby said container is swingable on said trunnions relative to the casing against said spring action from outside the casing while the casing is held in the hand for dispensing purposes.

17. A device of the class described comprising a casing having a shaker top, a container for the material to be dispensed pivotally mounted at its lower end in said casing for reciprocatory movement of the upper end thereof, the same having a top wall with shaker openings provided therein for dispensing material when said container is moved laterally into position to register said openings with related shaker openings provided in the shaker top of said casing, said container being substantially completely enclosed in said casing, said container having a rib on the side thereof projecting through a longitudinal slot provided in the side wall of said casing and adapted to be depressed by hand toward the wall of said casing while the casing is held in the hand for dispensing purposes, whereby to communicate movement to the container from one position to another, and spring means normally urging the container to move in one direction so as to project its rib from the casing.

18. A device of the class described comprising a casing having a shaker top with two sets of shaker openings provided therein, a container for the materials to be dispensed pivotally mounted at its lower end in said casing for reciprocatory movement of the upper end thereof, the container being longitudinally partitioned to provide two compartments for the materials to be dispensed and having a top wall with two sets of shaker openings provided therein for dispensing material from either compartment through related shaker openings in the shaker top of said casing, said container being substantially completely enclosed in said casing, said casing having a longitudinal rib on one side thereof, said container having a corresponding rib on the diametrically opposite side thereof projecting through a longitudinal slot provided in the side wall of said casing and adapted to be depressed by hand toward the wall of said casing while the casing is held in the hand for dispensing purposes, whereby to communicate movement to the container from one dispensing position to another, and spring means normally holding the container in one dispensing position so as to project its rib from the casing to approximately the same distance as the first-mentioned rib projects on the diametrically opposite side of the casing.

19. A device as set forth in claim 18, wherein said casing rib is hollow, and wherein the spring means comprises an elongated leaf spring housed in said rib and bearing against the adjacent side of the container.

20. A device of the class described comprising a casing having a shaker top with two sets of shaker openings provided therein, a container for the materials to be dispensed pivotally mounted at its lower end in said casing for reciprocatory movement of the upper end thereof, the container being longitudinally partitioned to provide two compartments for the materials to be dispensed and having a top wall with two sets of shaker openings provided therein for dispensing material from either compartment through related shaker openings in the shaker top of said casing, said container being substantially completely enclosed in said casing, said container having a rib on the side thereof projecting through a longitudinal slot provided in the side wall of said casing and adapted to be depressed by hand toward the wall of said casing while the casing is held in the hand for dispensing purposes, whereby to communicate movement to the container from one dispensing position to another, and spring means normally holding the container in one dispensing position so as to project its rib from the casing.

21. A device of the class described comprising a casing having a shaker top, a container for the materials to be dispensed pivotally mounted at its lower end in said casing for reciprocatory movement of the upper end thereof, the same having a top wall with shaker openings provided therein for dispensing material when said container is moved laterally into position to register said openings with related shaker openings provided in the shaker top of said casing, said casing having at its lower end internal substantially vertical grooves on the walls thereof at diametrically opposite sides, said container having diametrically opposed trunnions projecting from the sides thereof and entered in said grooves from the lower ends thereof for oscillatory movement therein, spring means acting normally to urge the container to swing in one direction on its trunnions, means supporting the container against downward displacement from operative position in said casing, and means whereby said container is movable by hand from outside said casing against the action of said spring while the casing is held in the hand for dispensing purposes.

22. In a salt and pepper shaker, an outer casing, a container therein for salt and pepper, said casing having an outwardly projecting longitudinal rib on the side thereof, said container in said casing having a similar longitudinal rib thereon protruding from the casing through a slot provided in the wall thereof, said container normally occupying one dispensing position with its rib protruding from the casing but being arranged to be moved by depression of said rib by hand to the other dispensing position when the casing is grasped, said container and casing having related perforated shaker tops arranged to register in the two positions of the container relative to the casing.

23. In a salt and pepper shaker, an outer casing, a container therein for salt and pepper, said container in said casing having a longitudinal rib on the side thereof protruding from the casing through a slot provided in the wall thereof, said container normally occupying one dispensing position with its rib protruding from the casing but being arranged to be moved by depression of said rib by hand to the other dispensing position when the casing is grasped, said container and casing having related perforated shaker tops arranged to register in the two positions of the container relative to the casing, and spring means acting between the casing and container and normally urging the latter in one direction so that the rib thereof protrudes from the casing.

EDWARD RICHTER.